United States Patent
Johnson

(10) Patent No.: US 10,252,714 B2
(45) Date of Patent: Apr. 9, 2019

(54) PARKING ASSISTANCE CONTROL FOR VEHICLE WITH AUTONOMOUS OPERATION CAPABILITY

(71) Applicant: Toyota Motor Engineering & Manufacturing North America, Inc., Erlanger, KY (US)

(72) Inventor: Miles J. Johnson, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 190 days.

(21) Appl. No.: 15/234,045

(22) Filed: Aug. 11, 2016

(65) Prior Publication Data

US 2018/0043884 A1 Feb. 15, 2018

(51) Int. Cl.
| | |
|---|---|
| *B60W 30/06* | (2006.01) |
| *B60W 10/184* | (2012.01) |
| *B60W 10/20* | (2006.01) |
| *B60W 50/12* | (2012.01) |
| *G05D 1/02* | (2006.01) |
| *G08G 1/14* | (2006.01) |
| *H04W 4/02* | (2018.01) |

(52) U.S. Cl.
CPC .......... *B60W 30/06* (2013.01); *B60W 10/184* (2013.01); *B60W 10/20* (2013.01); *B60W 50/12* (2013.01); *G08G 1/143* (2013.01); *G08G 1/147* (2013.01); *B60W 2420/52* (2013.01); *B60W 2550/20* (2013.01); *B60W 2550/40* (2013.01); *H04W 4/02* (2013.01)

(58) Field of Classification Search
CPC .... B60W 30/06; B60W 10/20; B60W 10/184; B60W 2550/20; B60W 2550/40; B60W 2420/52; B60W 50/12; G05D 1/0212
USPC ........................................................ 701/25
See application file for complete search history.

(56) References Cited

U.S. PATENT DOCUMENTS

| | | | |
|---|---|---|---|
| 8,847,790 B2 | 9/2014 | Trum | |
| 8,890,715 B2 | 11/2014 | Geelen | |
| 9,317,983 B2* | 4/2016 | Ricci | H04W 4/21 |
| 9,949,228 B2* | 4/2018 | Skaaksrud | H04W 12/06 |
| 10,023,231 B2* | 7/2018 | Ramanujam | B62D 15/0285 |
| 2007/0040701 A1* | 2/2007 | Browne | G08G 1/14 |
| | | | 340/932.2 |

(Continued)

*Primary Examiner* — Atul Trivedi
(74) *Attorney, Agent, or Firm* — Christopher G. Darrow; Darrow Mustafa PC

(57) ABSTRACT

Provided is a method and device parking assistance for a vehicle capable of autonomous operation. The embodiment herein operates to receive a parking zone, which is based on a destination location and a user-defined parking parameter, and includes a plurality of parking locations. When on approach to the parking zone under an autonomous vehicle operation, the parking assistance determines whether the parking zone includes at least one parking location that is physically available for parking the vehicle. When the parking zone does not, the parking assistance prompts the vehicle to engage in a holding pattern for a predetermined period of time. While in the holding pattern under the autonomous operation, the parking assistance periodically determines whether the at least one parking location becomes available. When the predetermined period of time lapses, parking status of the vehicle is transmitted to a vehicle user.

20 Claims, 6 Drawing Sheets

(56) References Cited

U.S. PATENT DOCUMENTS

| | | | |
|---|---|---|---|
| 2009/0198443 | A1 | 8/2009 | Yamazaki |
| 2011/0270669 | A1* | 11/2011 | Rowe ..................... G06Q 30/02 |
| | | | 705/14.37 |
| 2011/0320256 | A1* | 12/2011 | Florucci ............. G06Q 30/0226 |
| | | | 705/14.33 |
| 2014/0136414 | A1* | 5/2014 | Abhyanker ............ G06Q 50/28 |
| | | | 705/44 |
| 2014/0309838 | A1* | 10/2014 | Ricci ....................... H04W 4/21 |
| | | | 701/25 |
| 2015/0345965 | A1* | 12/2015 | Semsey .................. G07B 15/02 |
| | | | 701/537 |
| 2016/0003636 | A1* | 1/2016 | Ng-Thow-Hing ..... H04N 7/188 |
| | | | 701/26 |
| 2016/0320773 | A1* | 11/2016 | Skaaksrud ............ H04W 12/06 |
| 2017/0323227 | A1* | 11/2017 | Sadeghi ................ G07F 17/246 |
| 2017/0355307 | A1* | 12/2017 | Ha ......................... G08G 1/143 |
| 2018/0043905 | A1* | 2/2018 | Kim ........................ B60W 10/18 |
| 2018/0060775 | A1* | 3/2018 | Singhal ............ G06Q 10/06313 |
| 2018/0060783 | A1* | 3/2018 | Stefik ............... G06Q 10/06398 |
| 2018/0060789 | A1* | 3/2018 | Stefik ............. G06Q 10/063114 |
| 2018/0060790 | A1* | 3/2018 | Stefik ............. G06Q 10/063114 |
| 2018/0060795 | A1* | 3/2018 | Stefik ...................... G07B 15/02 |
| 2018/0060796 | A1* | 3/2018 | Stefik ...................... G07B 15/02 |
| 2018/0060797 | A1* | 3/2018 | Stefik ...................... G07B 15/02 |
| 2018/0060798 | A1* | 3/2018 | Stefik ............. G06Q 10/063116 |
| 2018/0099661 | A1* | 4/2018 | Bae .......................... B60R 1/00 |
| 2018/0121833 | A1* | 5/2018 | Friedman ........... G01C 21/3685 |
| 2018/0122245 | A1* | 5/2018 | Penilla ................. G05D 1/0011 |
| 2018/0232958 | A1* | 8/2018 | Wang ..................... G07B 15/02 |
| 2018/0286238 | A1* | 10/2018 | Linder .................. G08G 1/141 |

* cited by examiner

Parking Assistance Control Unit 200

PARKING ASSISTANCE CONTROL FOR VEHICLE WITH AUTONOMOUS OPERATION CAPABILITY

BACKGROUND

Vehicle parking provides challenges in urban areas, or in areas where parking is restrictive, for example, in festival or concert style events. It is desirable that an autonomous, driverless, or driver-assisted vehicle have an advanced self-driving or autonomous capability to locate available parking locations to park the vehicle.

SUMMARY

A system, device, and methods for a parking assistance control unit are disclosed.

In one implementation, a method in a parking assistance control unit for a vehicle capable of autonomous operation is disclosed. The method receives a parking zone, which is based on a destination location and a user-defined parking parameter, and includes a plurality of parking locations. When on approach to the parking zone under an autonomous vehicle operation, an operation of the method determines whether the parking zone includes at least one parking location that is physically available for parking the vehicle. When the parking zone does not, an operation of the method prompts the vehicle to engage in a holding pattern for a predetermined period of time. While in the holding pattern under the autonomous operation, the method operates to periodically determine whether the at least one parking location becomes available. When the predetermined period of time lapses, parking status of the vehicle is transmitted to a vehicle user.

In another implementation, a parking assistance control unit for an autonomous vehicle is disclosed. The parking assistance control unit includes a wireless communication interface to service communication with user equipment of a vehicle user, and a plurality of sensor devices disposable about the vehicle. Also included is one or more processors coupled to the wireless communication interface and in communication with the plurality of sensor devices, the one or more processors for controlling operations of the parking assistance control unit, and a memory coupled to the one or more processors. The memory for storing data and program instructions used by the one or more processors, wherein the one or more processors are configured to execute instructions stored in the memory to receive a parking zone, which is based on a destination location and a user-defined parking parameter, and includes a plurality of parking locations. When on approach to the parking zone under an autonomous vehicle operation, the parking assistance device determines whether the parking zone includes at least one parking location that is physically available for parking the vehicle. When the parking zone does not, the parking assistance control unit prompts the vehicle to engage in a holding pattern for a predetermined period of time. While in the holding pattern under the autonomous operation, the parking assistance control unit operates to periodically determine whether the at least one parking location becomes available. When the predetermined period of time lapses, parking status of the vehicle is transmitted to the user equipment of the vehicle user.

In yet another implementation, a parking assistance device is disclosed. The parking assistance device includes one or more sensor devices disposable about a vehicle, the one or more sensor devices configured to monitor surroundings relative to the vehicle. A wireless communication interface operable to service communications is coupled to a computing device, which is in communication with the one or more sensor devices. The computing device includes one or more processors, the one or more processors controlling operations of the parking assistance device, and a memory coupled to the one or more processors, the memory for storing data and program instructions used by the one or more processors. The one or more processors are configured to execute instructions stored in the memory to receive a parking zone, which is based on a destination location and a user-defined parking parameter, and includes a plurality of parking locations. When on approach to the parking zone under an autonomous vehicle operation, the parking assistance device determines whether the parking zone includes at least one parking location that is physically available for parking the vehicle. When the parking zone does not, the parking assistance device prompts the vehicle to engage in a holding pattern for a predetermined period of time. While in the holding pattern under the autonomous operation, the parking assistance device operates to periodically determine whether the at least one parking location becomes available. When the predetermined period of time lapses, a parking status of the vehicle is transmitted to the user equipment of the vehicle user.

BRIEF DESCRIPTION OF THE DRAWINGS

The description makes reference to the accompanying drawings wherein like reference numerals refer to like parts throughout the several views, and wherein.

DETAILED DESCRIPTION

Parking assistance for an autonomous vehicle is described herein. One example method provides for a parking zone with at least one parking space. When a vehicle user arrives at a destination location, the vehicle user may depart the vehicle, which may autonomously park based on parameter input by the vehicle user. The vehicle user inputs may be made through a graphic user interface (GUI) of the vehicle, or a GUI of a mobile device. Based on the vehicle user input, the parking assistance receives a parking zone, which includes a number of parking locations. At the time of the designation by the vehicle user, the presence of the parking locations may be discerned from databases and/or mapping technologies, but the availability upon arriving at the location may differ. Accordingly, an autonomous vehicle discerns the availability of the parking locations based on the user input.

When on approach to the parking zone while under an autonomous vehicle operation, the parking assistance device and method of the disclosure determines whether the parking zone includes at least one parking location that is physically available for parking the vehicle. When the parking zone does not, the parking assistance prompts the vehicle to engage in a holding pattern for a predetermined period of time. While in the holding pattern under the autonomous operation, the parking assistance device and method periodically determine whether the at least one parking location becomes available. When the predetermined period of time lapses, a parking status of the vehicle is transmitted to a mobile device of the vehicle user. The parking status includes location information of the vehicle, and whether the vehicle has successfully parked at a parking location, or in the alternative and has not. When the vehicle has not, the parking assistance device may receive further instructions from the vehicle user.

Embodiments of the present disclosure are directed to autonomous parking systems and methods wherein information generated or otherwise may be provided by an application running on user equipment or a mobile device is received by a parking assistance device relating to parking preferences of a user. An example of user equipment or a mobile device includes a cell phone, a smart phone, a personal digital assistant, tablet computer, e-readers, laptop computers, etc.

Figure 1:
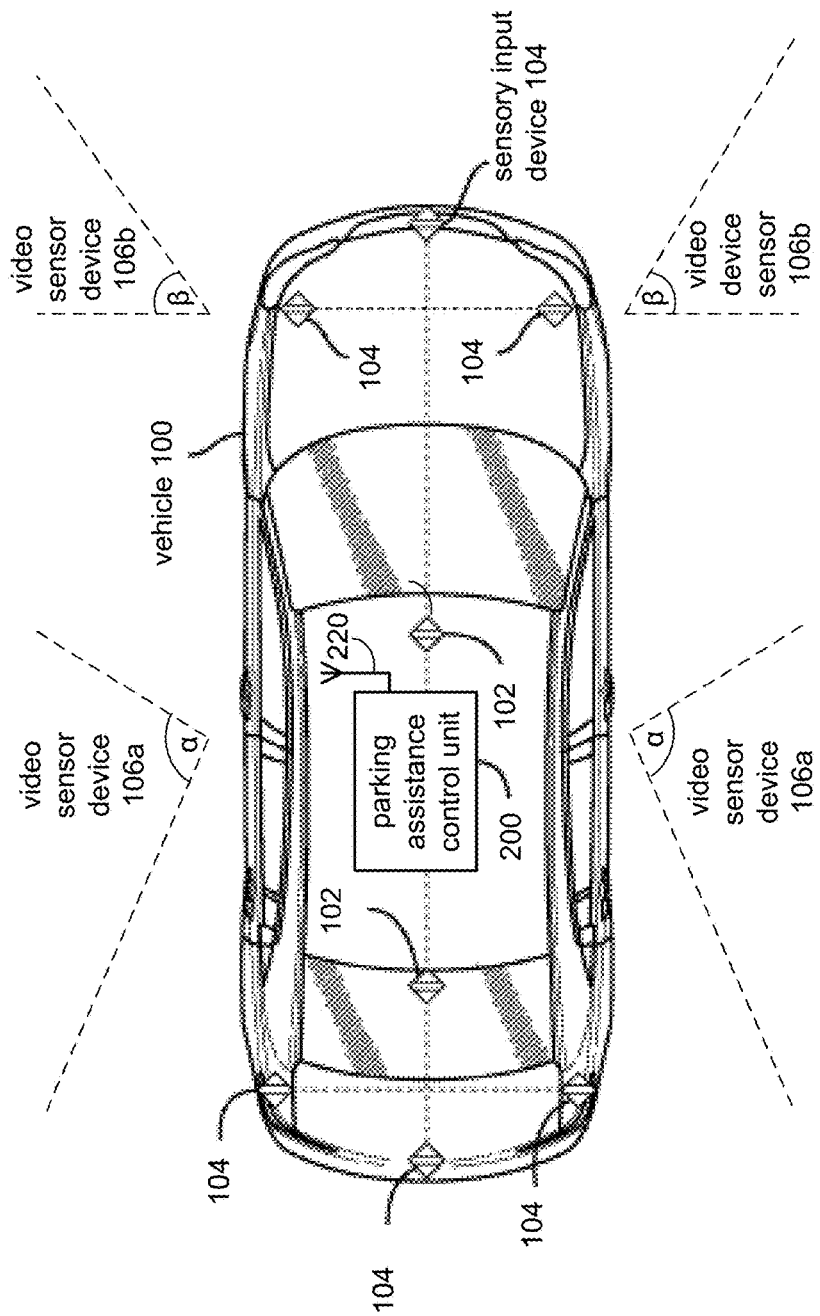
FIG. 1 is a schematic illustration of a vehicle including a parking assistance control unit.

FIG. 1 is a schematic illustration of a vehicle 100 including a parking assistance control unit 200. A plurality of sensor devices 102, 104 and 106 are in communication with the control unit 200. The plurality of sensor devices 102, 104 and 106 can be positioned on the outer surface of the vehicle 100, or may be positioned in a concealed fashion for aesthetic purposes with regard to the vehicle. Moreover, the sensor devices may operate at frequencies in which the vehicle body or portions thereof appear transparent to the respective sensor device. Communication between the sensor devices may be on a bus basis, and may also be used or operated by other systems of the vehicle 100. For example, the sensor devices 102, 104 and 106 may be coupled by a combination of network architectures such as a Body Electronic Area Network (BEAN), a Controller Area Network (CAN) bus configuration, an Audio Visual Communication-Local Area Network (AVC-LAN) configuration, and/or other combinations of additional communication-system architectures to provide communications between devices and systems of the vehicle 100. Moreover, the sensor devices 102, 104 and/or 106 may be further coupled to the parking assistance control unit 200 via such communication-system architectures.

The sensor devices 102, 104 and 106 operate to monitor ambient conditions relating to the vehicle 100, including audio, visual, and tactile changes to the vehicle environment. The sensor devices may include audible sensor devices 102, sensory input devices 104, and video sensor devices 106a and 106b.

The audible sensor devices 102 provide audible sensing of the ambient conditions of the vehicle. With speech recognition capability, the audible sensor devices 102 may receive instructions to move, or to receive other such directions. The audible sensor devices 102 may be provided, for example, by a nano-electromechanical system (NEMS) or micro-electromechanical system (MEMS) audio sensor omnidirectional digital microphone, a sound-triggered digital microphone, etc.

The sensory input devices 104 provide tactile or relational changes in the ambient conditions of the vehicle, such as an approaching person, object, vehicle, etc. The one or more of the sensory input devices 104 can be configured to capture changes in velocity, acceleration, and/or distance to these objects in the ambient conditions of the vehicle 100, as well as an angle of approach. The sensory input devices 104 may be provided by a Light Detection and Ranging (LIDAR) system, in which the sensory input devices 104 may capture data related to laser light returns from physical objects in the environment of the vehicle 100. The sensory input devices 104 may also include a combination of lasers (LIDAR) and milliwave radar devices.

The video sensor devices 106a and 106b include associated fields of view. For the example of FIG. 1, the video sensor device 106a has a three-dimensional field-of-view of angle-$\alpha$, and the video sensor device 106b has a three-dimensional field-of-view of angle-$\beta$, with each video sensor having a sensor range for video detection.

In the various driving modes, the examples of the placement of the video sensor devices 106a for blind-spot visual sensing (such as for another vehicle adjacent the vehicle 100) relative to the vehicle user, and the video sensor devices 106b are positioned for forward periphery visual sensing (such as for objects outside the forward view of a vehicle user, such as a pedestrian, cyclist, etc.).

In autonomous parking operations directed by the parking assistance control unit 200, the video sensor devices 106a and 106b may be further deployed to read lane markings and determine vehicle positions with the road to facilitate the relocation of the vehicle 100.

For controlling data input from the sensor devices 102, 104 and 106, the respective sensitivity and focus of each of the sensor devices may be dynamically adjusted to limit data acquisition based upon speed, terrain, activity around the vehicle, etc.

For example, though the field-of-view angles of the video sensor devices 106a and 106b may be in a fixed relation to the vehicle 100, the field-of-view angles may be adaptively increased and/or decreased based upon the vehicle's driving mode, such as a highway driving mode to take in less of the ambient conditions in view of the more rapidly changing conditions relative to the vehicle 100, a residential driving mode to take in more of the ambient conditions that may change rapidly (such as a child's ball crossing in front of the vehicle, etc.), a parking mode in which a full field-of-view may be used to increase a sensitivity towards changes in ambient conditions relative to the vehicle 100, with the sensitivity extended further to realize changes in at least one ambient condition relative to the vehicle.

Also, some of the sensor devices may effectively be blocked depending upon the driving mode of the vehicle 100. For example, when the vehicle 100 is traveling at highway, or even residential, speeds, the audible sensor devices 102 simply detect white noise from the air moving across the microphone pick-up and may not be sufficiently filtered to remove the extraneous data input. In such instances, the input from the audible sensor devices 102 may be switched to an off or placed in a sleep mode until the vehicle 100 returns to a lower rate of speed.

The vehicle 100 can also include options for operating in manual mode, autonomous mode, and/or driver-assist mode. When the vehicle 100 is in manual mode, the driver manually controls the vehicle systems, which may include a propulsion system, a steering system, a stability control system, a navigation system, an energy system, and any other systems that can control various vehicle functions (such as the vehicle climate or entertainment functions, etc.). The vehicle 100 can also include interfaces for the driver to interact with the vehicle systems, for example, one or more interactive displays, audio systems, voice recognition systems, buttons and/or dials, haptic feedback systems, or any other means for inputting or outputting information.

In autonomous mode of operation, a computing device, which may be provided by the autonomous parking controller 200, or in combination therewith, can be used to control one or more of the vehicle systems without the vehicle user's direct intervention. Some vehicles may also be equipped with a "driver-assist mode," in which operation of the vehicle 100 can be shared between the vehicle user and a computing device. For example, the vehicle user can control certain aspects of the vehicle operation, such as steering, while the computing device can control other aspects of the vehicle operation, such as braking and acceleration. When the vehicle 100 is operating in autonomous (or driver-assist) mode, the computing device 100 issues commands to the various vehicle systems to direct their operation, rather than such vehicle systems being controlled by the vehicle user.

As shown in FIG. 1, the autonomous parking controller 200 is configured to provide wireless communication with a user device through the antenna 220, other vehicles (vehicle-to-vehicle), and/or infrastructure (vehicle-to-infrastructure), which is discussed in detail with respect to FIGS. 2-6.

Figure 2:
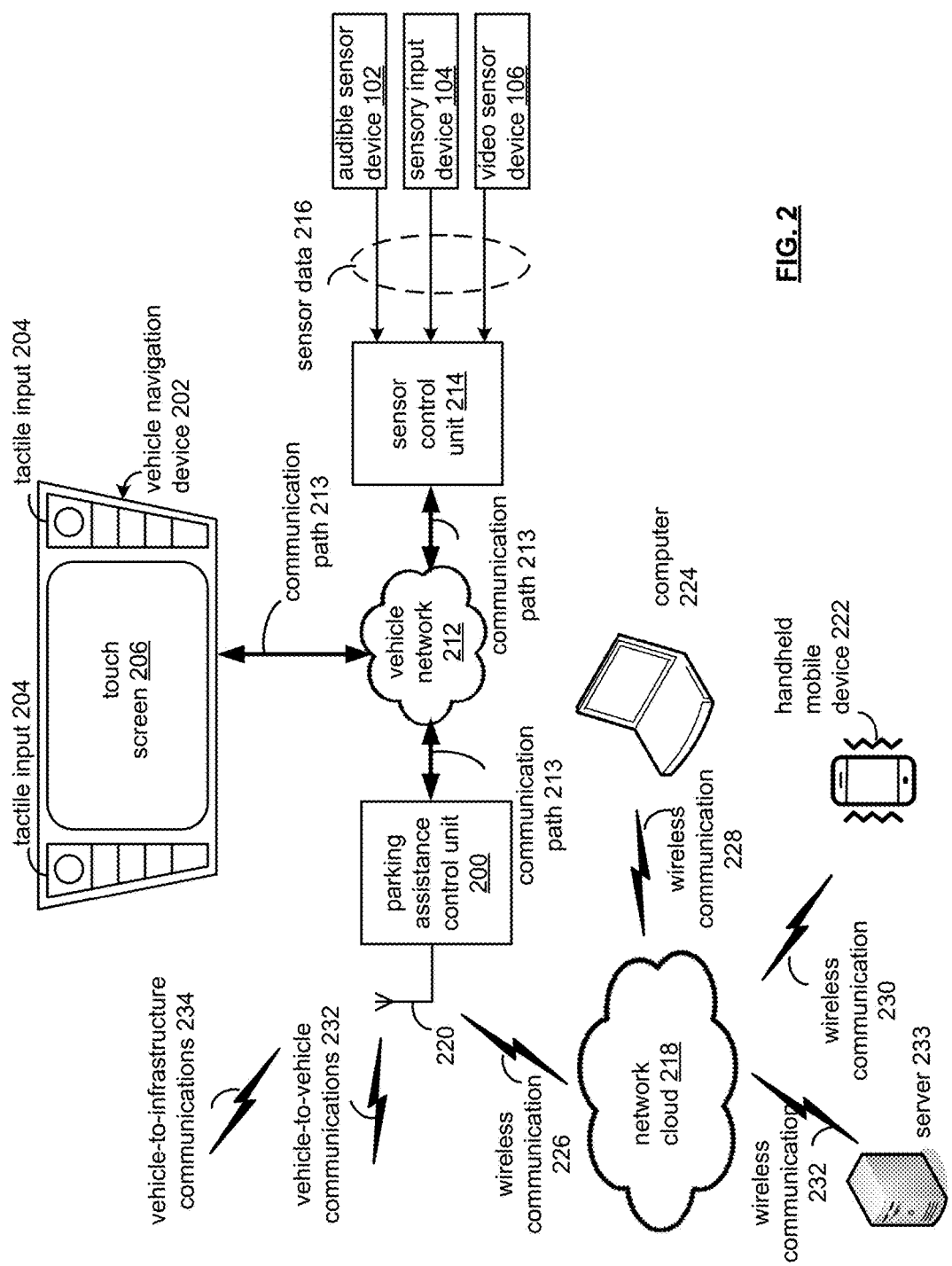
FIG. 2 is a block diagram of a the parking assistance control unit of FIG. 1 in the context of a network environment.

Referring now to FIG. 2, a block diagram of a parking assistance control unit 200 in the context of a network environment is provided. While the parking assistance control unit 200 is depicted in abstract with other vehicular components, the parking assistance control unit 200 may be combined with the system components of the vehicle 100 (see FIG. 1). Moreover, the vehicle 100 may also be an automobile or any other passenger or non-passenger vehicle such as, for example, a terrestrial, aquatic, and/or airborne vehicle.

As shown in FIG. 2, the parking assistance control unit 200 communicates with a vehicle navigation device 202 via a communication path 213, and is also communicatively coupled with a network cloud 218 via an antenna 220 and wireless communication 226. In this manner, the parking assistance control unit 200 operates to receive input data, and provide data to, the vehicle navigation device 202, the sensor control unit 214, and to other devices that may communicatively couple via the network 218, including devices such as a computer 224, a mobile handheld device 222 (a cell phone, a smart phone, a personal digital assistant (PDA) devices, tablet computer, e-readers, laptop computers, etc.).

As may also be appreciated, the antenna 220 operates to provide communications with the parking assistance control unit 200 through vehicle-to-vehicle communications 232, and through vehicle-to-infrastructure communications 234.

In vehicle-to-vehicle communication 232, another vehicle messages the vehicle 100 (see FIG. 1) through dedicated short-range radio communications to exchange messages. In the example provided by FIG. 2, the vehicle-to-vehicle communication 232 provides information on the availability of a parking location being physically available for parking the vehicle. Another vehicle may indicate, for example, that it is leaving a parking location, and that the parking location will become available shortly, as well as indicating that the parking location is occupied, and may remain that way for the near future. Moreover, the vehicle-to-vehicle communications 232 may be in the form of a chain message passed wirelessly by other vehicles. In effect, the parking assistance control unit 200 may receive advance notice, or indication, of a change in availability for a parking location.

Vehicle-to-infrastructure communications 234 may operate to coordinate parking location availability to the parking assistance control unit 200, and may further operate to gather local information on parking conditions within a congested area. With this information, a vehicle-to-infrastructure communications device may provide a suggested parking location to the vehicle 100 (see FIG. 1). Roadside or parking devices may provide ramp and/or parking metering, which provides measurements of traffic density on a roadway or parking area based upon sensor technologies.

Also, through the sensor control unit 214, the parking assistance control unit 200 may access sensor data 216 of the audible sensor device 102, sensory input device 104, and video sensor device 106 to operate in autonomous parking operations described herein, directed by the parking assistance control unit 200. With the sensor data 216, the parking assistance control unit 200 may operate, in a parking mode, to read lane markings, determine vehicle positions with the road to facilitate the parking of the vehicle 100, as well as determine availability a parking location within a parking zone with respect to a destination location as indicated by the user through the touch screen 206, the computer 224, the mobile handheld device 222.

For further example, the sensor data 216 operates to permit object detection external to the vehicle, such as for example, other vehicles (including vehicles occupying a parking location), roadway obstacles, traffic signals, signs, trees, etc. Accordingly, the sensor data 216 allow the vehicle 100 (see FIG. 1) to assess its environment in order to maximize safety for vehicle passengers, objects and/or people in the environment.

Still referring to FIG. 2, the vehicle navigation device 202 includes, for example, tactile input 204 and a touch screen 206. The touch screen 206 operates to provide visual output or graphic user interfaces such as, for example, maps, navigation, entertainment, information, infotainment, and/or combinations thereof.

The touch screen 206 may include mediums capable of transmitting an optical and/or visual output such as, for example, a cathode ray tube, light emitting diodes, a liquid crystal display, a plasma display, etc. Moreover, the touch screen 206 may, in addition to providing visual information, detect the presence and location of a tactile input upon a surface of or adjacent to the display. Accordingly, the display may receive mechanical input directly upon the visual output provided by the touch screen 206. Additionally, it is noted that the touch screen 206 can include at least one or more processors and one or more memory modules.

The vehicle navigation device 202 may also include tactile input 204 and/or control inputs such that the communication path 213 communicatively couples the tactile input 204 to other control units and/or modules of the vehicle 100 (see FIG. 1). The tactile input data may be provided by devices capable of transforming mechanical, optical, or electrical signals into a data signal capable of being transmitted via the communication path 213. The tactile input 204 may include a number of movable objects that each transform physical motion into a data signal that can be transmitted over the communication path 213 such as, for example, a button, a switch, a knob, a microphone, etc.

The touch screen 206 and the tactile input 204 may be combined as a single module, and may operate as an audio head unit or an infotainment system of the vehicle 100. The touch screen 206 and the tactile input 204 can be separate from one another and operate as a single module by exchanging signals via the communication path 104.

Touch screen 802 may include a display screen, such as a liquid crystal display (LCD), light emitting diode (LED), plasma display or other two dimensional or three dimensional display that displays graphics, text or video in either monochrome or color in response to display data 810.

As may be appreciated, the communication path 213 of the vehicle network 212 may be formed of a medium suitable for transmitting a signal such as, for example, conductive wires, conductive traces, optical waveguides, or the like. Moreover, the communication path 213 can be formed from a combination of mediums capable of transmitting signals. In one embodiment, the communication path 213 can comprise a combination of conductive traces, conductive wires, connectors, and buses that cooperate to permit the transmission of electrical data signals to components such as processors, memories, sensors, input devices, output devices, and communication devices. Accordingly, the communication path 213 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100. The term "signal" relates to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

For mapping data to display via the touch screen 206, the vehicle network 212 may be communicatively coupled to receive signals from global positioning system satellites, such as via the antenna 220 of the parking assistance control unit 200, or other such vehicle antenna (not shown). The antenna 220 may include one or more conductive elements that interact with electromagnetic signals transmitted by global positioning system satellites. The received signals may be transformed into a data signal indicative of the location (for example, latitude and longitude positions), and further indicative of the positioning of the vehicle with respect to road data, in which a vehicle position can be indicated on a map displayed via the touch screen 206, or displayed via the display screens via the computer 224 over wireless communication 228, or the handheld mobile device 222 over wireless communication 230 through the network cloud 218.

The wireless communication 226, 228 and 230 of the network cloud 218 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, ZigBee, and/or variations thereof.

As is noted above, the parking assistance control unit 200 may be communicatively coupled to a computer 224 via wireless communication 228, a handheld mobile device 222 via wireless communication 230, etc. As described in more detail below, application data may be provided to the parking assistance control unit 200 from various applications running and/or executing on wireless platforms of the computer 224 and the handheld mobile device 222, as well as from the vehicle navigation device 202 via the vehicle network 212.

The handheld mobile device 222 and/or computer 224, by way of example, may be a device including hardware (for example, chipsets, processors, memory, etc.) for communicatively coupling with the network cloud 218, and also include an antenna for communicating over one or more of the wireless computer networks described herein.

Also, in reference to FIG. 2, a server 233 may be communicatively coupled to the network cloud 218 via wireless communication 232. The server 233 may include third party servers that are associated with applications running and/or executed on the handheld mobile device 222, the computer 224, the vehicle navigation device 202, etc. For example, application data associated with a first application running on the mobile device 222 (e.g., OpenTable) may be stored on the server 233. The server 233 may be operated by an organization that provides the application, and application data associated with another application running on the mobile device 233 may be stored on yet another server. It should be understood that the devices discussed herein may be communicatively coupled to a number of servers by way of the network cloud 218.

Figure 3:
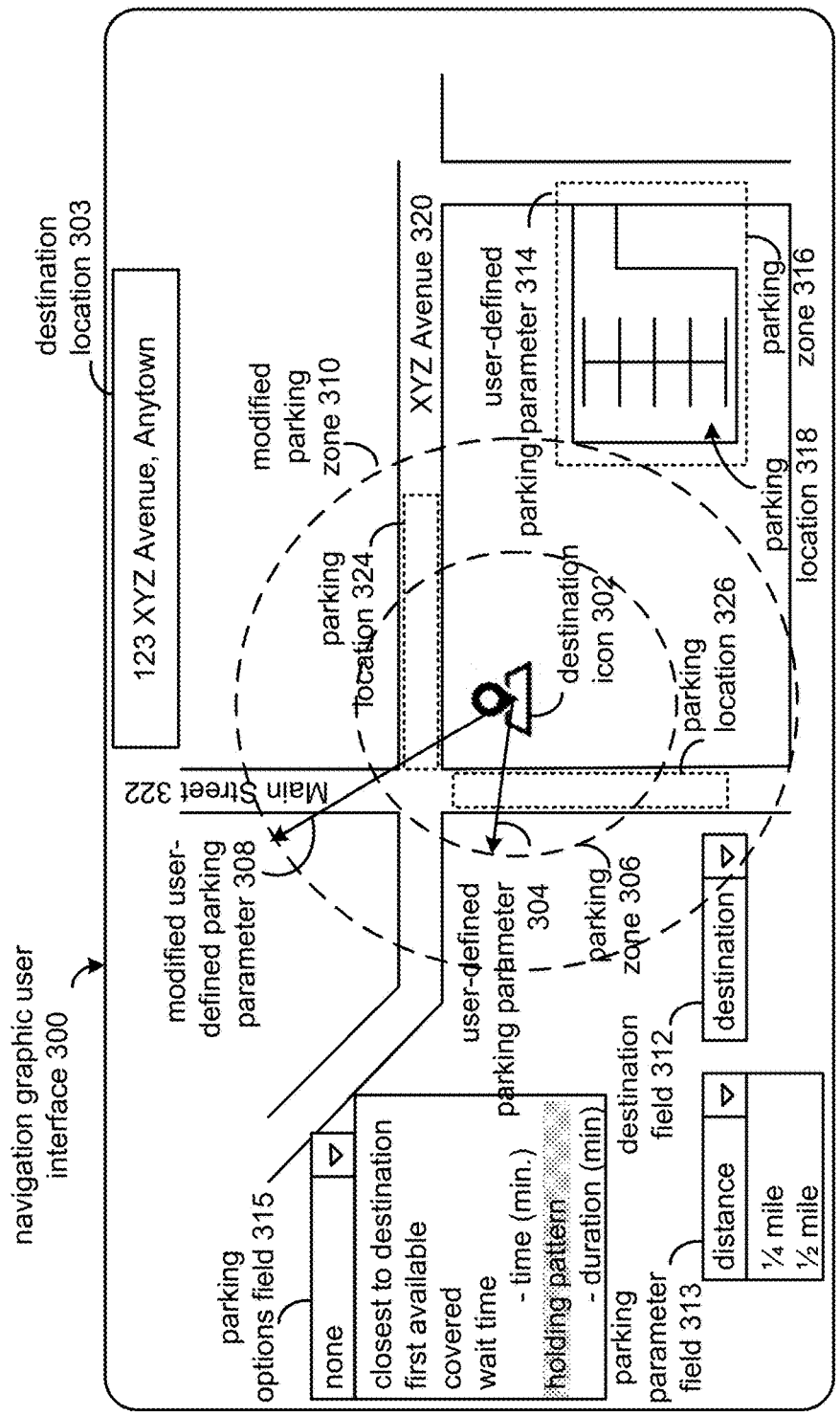
FIG. 3 is an illustration of a graphic user interface for receiving user input for parking assistance control unit of FIG. 1.

Referring now to FIG. 3, a graphic user interface 300 is shown depicting a mapping as related to a destination location 303.

As may be appreciated, the navigation graphic user interface 300 may be presented to a vehicle user through either of the vehicle navigation device 202, the computer 224, the handheld mobile device 222, etc. In this manner, the parking assistance control unit 200 may operate to receive parameters regarding parking of the vehicle 100 in an autonomous parking mode of operation.

The graphic user interface 300 may display various roadways associated with the geographic area and/or region within the proximity of the destination location 303, which may be entered via the destination field 312, by entering a location or selecting a destination location from a pull-down menu. In the example of FIG. 3, the destination location is "123 XYZ Avenue, Anytown," as shown in destination location 303, and represented pictorially by a destination icon 302, as an example. Other forms of icons may be used to visually indicate the location on the map, including as a business name, building outline, etc., and the destination icon 302 is provided as an example. The geographic information displayed by the navigation graphic user interface 300 may be based at least in part on information provided by GPS systems, and further rendered by mapping applications, which may be provided by servers, such as server 233 (see FIG. 2).

The navigation graphic user interface 300 includes a first road 132*a* (123 XYZ Avenue, Anytown) that intersects a second road 322 (Main Street). It should be understood that embodiments described and illustrated herein are not limited to any icon format or style, and that any type of icon and/or font may be used to depict the various information described herein via the navigation graphic user interface 300. The user may have selected a destination location via any one of the input devices 202, 222, 224 such that a route may be highlighted on the navigation graphic user interface 300 in embodiments that are configured to provide directions to a user-selected destination.

With respect to autonomous parking, the controller 200 (see FIG. 2) provides the navigation graphic user interface 300 to solicit vehicle user inputs. For example, the parking assistance control unit 200 solicits information through a destination field 312, a parking parameter field 313, and a parking options field 315. These fields are depicted as being pull-down menus for choice options relating to the field, but may be implemented in other user accessible selection embodiments, such as a scrolling option list, etc.

The destination field 312 may receive user text input for addresses, cities, zip codes, etc., and a combination thereof. For the example for FIG. 3, the address of "123 XYZ Avenue, Anytown." Upon locating the destination location in mapping data, the navigation graphic user interface 300 presents a mapping layout pertaining to the location. The relational position of the destination location is relayed to a vehicle user by the destination icon 302, and the information reflected in the destination location 303. As may be appreciated, navigational activities may be conducted to determine a navigable path to the destination location 302, as well as time estimations, etc.

The autonomous parking mode of the vehicle 100 permits the vehicle user to arrive at the destination location without the effort to locate a parking location. That is, the vehicle user and/or occupant may depart the vehicle 100 at the destination. The vehicle 100, in an autonomous parking mode of operation, may then locate a parking location under the parameters provided under the parking parameter field 313 and/or the parking options field 315. The parking parameter field 313 provides a vehicle user options with respect to a distance for use in a parking zone in relation to the destination location, depicted by the destination icon 302, which in the present example is proximate the intersection of XYZ Avenue 320 and Main Street 322. For example, the vehicle user may select a distance of one-quarter mile. The vehicle user may also designate a secondary or modified parking parameter field 313 with the selection of an alternate distance, such as one-half mile.

In FIG. 3, the parking zone 306 and modified parking zone 310 are shown as a circular area with the destination location serving as a center of the circular area. As shown, the parking zone 306 provides visual information to the vehicle user of the proximity of the parking locations within the parking parameter field 313, such as parking location 326 and parking location 324. As may appreciated, a vehicle user may choose other values for the parking parameter field 313, such as distances in tens-of-feet, hundreds-of-feet, etc., and that other geometric areas may be used, such as areas depicted as a square, rectangle, etc., in a relational manner to the destination location.

Also, the vehicle user may also provide a secondary selection for the parking parameter field 313, such as for example, one-half mile, to define a modified user-defined parking parameter 308 that defines a modified parking zone 310. The use of the modified user-defined parking parameter 308 provides additional parking locations that may not otherwise be available closer to the destination location. For example, a vehicle user may prefer that the vehicle 100 autonomously park closer to the destination location for security purposes or exposure to elements (such as parking in an area susceptible to flooding), for a reduced transit time for the vehicle when summoned, and/or for the owner to be able walk to the vehicle (such as to retrieve an item within the vehicle).

The parking zones 324, 326, and 316 may be provided with and/or by the mapping information, which may be captured through business titles (for example, "Central Parking," "Pilgrim Parking," etc.), through informational databases that provide street parking information and local parking ordinances, and the like.

Also, a priority selection of the zones 306, 310 and 316 may be made through navigational device 202, or that of the computer 224 and/or handheld mobile device 222, and received by the parking assistance control unit 202. That is, in the alternative, the vehicle user may use touch screen 206 or cursor selection through tactile input 204 of the navigational device 202 (see FIG. 2) to obtain the vehicle user preferences relating to vehicle parking. For example, by using the touch screen 206, the vehicle user presses on parking zone 306 and then parking zone 316. The parking assistance control unit 200 prioritizes autonomous parking to these zones, accordingly.

In the event that the parking assistance control unit 200 is unable to locate an available parking location within the parking zone 306, such as during rush hour in an urban business district, during festivals in urban areas, etc., the parking assistance control unit 200 may use the modified user-defined parking parameter 308 to locate a parking location for the vehicle 100 in the increased area defined by the modified parking zone 310. As may be appreciated, the amount of prospective parking locations 324 and 326 correspondingly increase by the larger modified parking zone 310.

The parking options field 315 provide additional autonomous parking options and/or parameters to the vehicle user and/or occupant. A selection of "none" may be made, or other options may be selected singularly and/or in combination, as feasible. For example, the vehicle user may have the options that include a parking location "closest to destination," a parking location that is "first available," a parking location that is "covered," a parking location within a "wait time" following a summons by the vehicle owner, and a "holding pattern" and duration (in minutes and/or hours), in the event a parking location is not available in the parking zone 306, or the selected parking zone 316.

When the vehicle user selects "holding pattern" and a "duration," the parking assistance control unit 200 operates to engage the vehicle 100 in a holding pattern mode of travel to locate an available parking location based on the criteria set out by the parking parameter field 313. In the present example, the priority by the user is for a parking location 326 of parking zone 306. The next order-of-preference by the vehicle user is for parking zone 316, with parking location 318. The parking assistance control unit 200 prompts the vehicle 100 to engage in a holding pattern for a duration of time, which may be designated by the vehicle user at the parking options field 315. The holding pattern is determined by the parking assistance control unit 200, and is discussed in detail with reference to FIG. 4.

Figure 4:
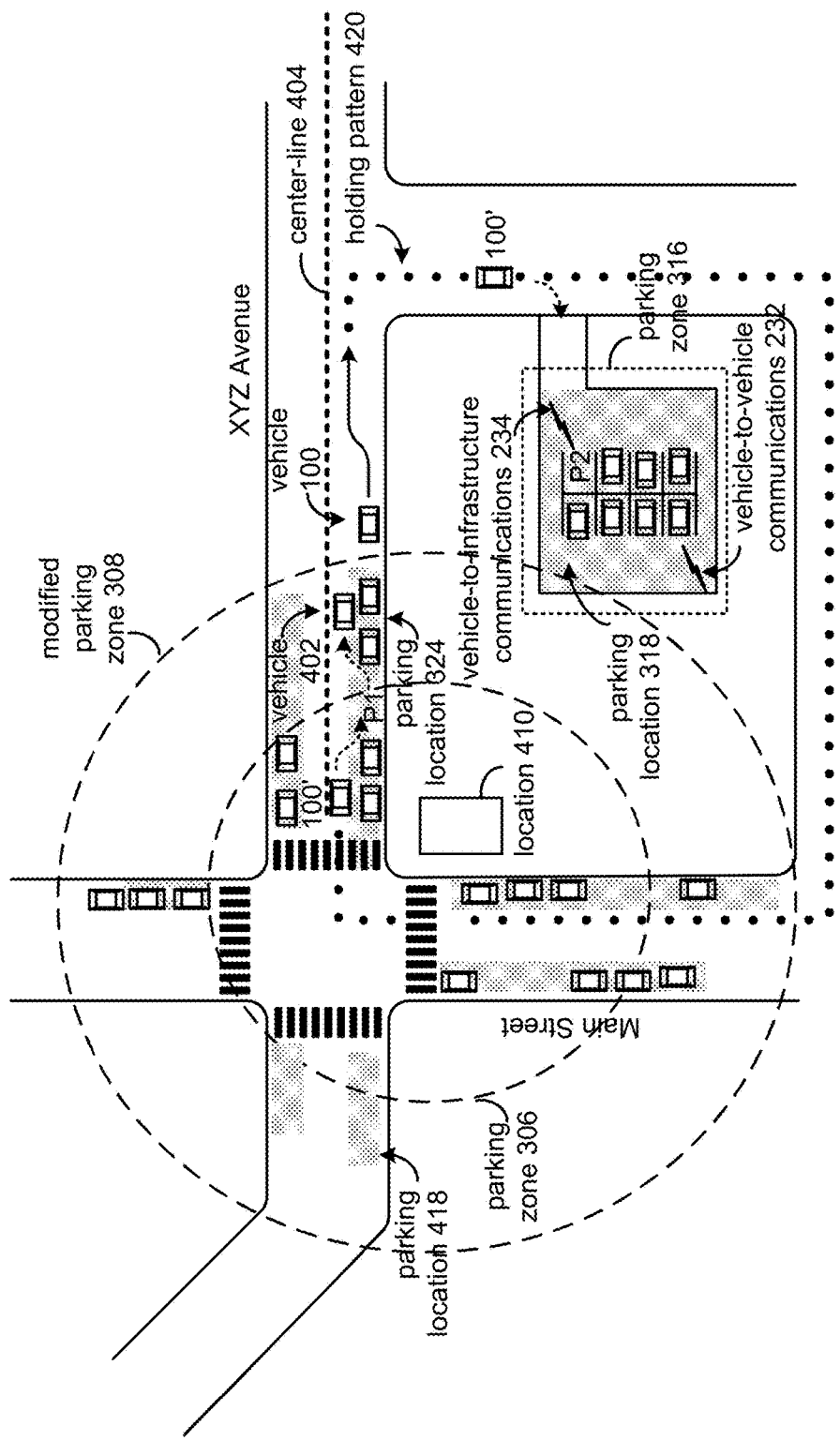
FIG. 4 is a diagram of a physical layout corresponding to the mapping of the navigation graphic user interface of FIG. 3.

FIG. 4 is a diagram of a physical layout corresponding to the mapping of the navigation graphic user interface 300 of FIG. 3. The physical layout depicts traffic signage, placement of vehicles, location of buildings, parking locations, etc.

In FIG. 4, a holding pattern 420 is shown that may be a dynamic holding pattern, a stationary holding pattern adjacent to a parking location, or a combinational stationary and dynamic holding pattern. For a holding pattern, the parking assistance control unit designates destinations as parking zones 306 and 316. Accordingly, for the purposes of autonomous parking, the parking assistance control unit 200 may treat the respective parking zones as destinations, with each having prospective parking locations being or becoming available.

In this manner, a vehicle user may select a destination location, and leave the parking to the vehicle 100 in an autonomous operational mode. The vehicle 100 may then be parked in a parking zone that includes a many parking locations. As set up in the navigation graphic user interface 300, the parking zone may be based on the vehicle user input, including the destination location, and a user-defined parking parameter, such as distance from the destination location, covered parking, well-lit parking zones, or a selected parking zone from several parking zones, as discussed in detail with reference to FIGS. 3-6.

In operation, the parking assistance control unit 200 receives a parking zone based on the location 410 and a parking parameter, such as a distance from the location in which to park the vehicle 100. When on approach to a parking zone 306 and/or 316, the control unit 200 determines whether the respective parking zone 306 or 316 include at least one parking location that is available for parking of the vehicle 100. When the parking zone does not include at least one parking location that is available for the vehicle 100, the parking assistance control unit 200 prompts the vehicle 100 to engage in a holding pattern for a predetermined period of time. The form of holding pattern may be selected by a vehicle user, or may be selected by the parking assistance control unit 200. When selected by the parking assistance control unit 200, environmental factors may be considered such as traffic flow, the amount of possible parking locations, parking location turnover, etc. For example, with a heavy traffic flow, a limited amount of possible parking locations, and low parking location turnover (for example, in an office district in which low parking location turnover occurs during the hours of 9:00 am to 5:00 pm), the parking assistance control unit 200 may generate a longer holding pattern 420. In contrast, with medium-to-heavy traffic flow, a higher amount of possible parking locations (based on parking ratios, such as the number of parking locations per thousand square feet of building space), and higher parking location turnover (such as in a retail district, in which briefer business and/or transactions occur), the parking assistance control unit 420 generates a shorter holding pattern 420. Information regarding these factors may be obtained from vehicle-to-infrastructure communications 234, as well as vehicle-to-vehicle communications 232. In effect, the traffic flows may take into consideration a traffic density assessment, and a local venue assessment, such as concerts, festivals, etc.

The holding pattern 420 by the parking assistance control unit 200 operates to permit further flexibility to a vehicle user in the event a parking location is not available because the vehicle 100 remains capable of being summoned by the vehicle user. Referring briefly back to FIG. 3, a vehicle user may enter the predetermined period of time for the holding patterns as a "duration". The duration may be the period that the vehicle user may expect to conduct business or an errand at the destination location, or may be an estimate by the parking assistance control unit 200 of sufficient time to increase the likelihood of coming upon an available parking location.

Whether the vehicle 100 is located at a parking location or in a holding pattern, the vehicle user may summon the vehicle 100. Locating an available parking location with the use of a holding pattern, however, operates to conserve fuel costs (petroleum-based fuel and/or electric cell fuel costs), and also aids in reducing traffic congestion.

Whether a parking location within a parking zone is available may be based on whether the parking location is not occupied. Other considerations of a parking location availability may also include whether the parking location has dimensions sufficient to receive the vehicle, whether due to the space allotted to the parking location, or whether other vehicles have parked such that the vehicle 100 may not fit properly in the parking location. Further considerations may include parking ordinances and/or other such restrictions that would not permit a parking location to otherwise be available.

When a holding pattern is a dynamic holding pattern, the parking assistance control unit 200 operates to place the vehicle 100 (FIG. 1) in motion in traffic, where one of many possible parking locations 318, 324, 326, of the respective parking zones 316 and 306 may become available. The holding pattern is resource intensive because autonomous driving results in additional miles being added to the trip. Also, when heavy traffic is present (for example, as may be indicated by vehicle-to-infrastructure devices, for example), placing the vehicle 100 into the traffic flow to find an available parking location adds to the traffic congestion. Statistical considerations may be used to indicate the likelihood that there may be an available parking location with regard to traffic conditions, and also with regard to a time factor.

When a holding pattern is a stationary holding pattern adjacent to a parking location, the parking assistance control unit 200 waits for a parking location to become available. The parking assistance control unit 200 stationary holding pattern may be applied, for example, in the instance of larger amount of parking location turnover. In the example of FIG. 4, the vehicle 100 is adjacent parking location 324. Vehicle 402, as indicated by phantom lines, has moved from an available parking location P1 within the parking zone 306, which is the first choice for parking locations by the vehicle user, as set out in the example provided with FIG. 3. Also, for comparison, the parking zone 316 includes a parking location P2. When the vehicle user selects a "first available" option from the parking options field 315, the vehicle 100 will determine the availability of the parking location P2 because it is the "first available" with respect to the holding pattern 420. Also, when the "closest to destination" option from the parking options field 315 is selected, the vehicle 100 would continue on the holding pattern 420 to reach the parking location P1 (shown as vehicle 100') that had become available to the parking location 324. In a dynamic holding pattern, the vehicle 100 would remain in motion. In the present example, the vehicle 100 is in a dynamic holding pattern that goes around the bock of the location 410.

In a combinational stationary and dynamic holding pattern, the vehicle may be in a stopped state, but then proceed along a holding pattern 420. In the example of FIG. 4, the vehicle 100 is stopped along the side of the road "XYZ Avenue," but outside the parking zone 316. The parking assistance control unit 200 causes the vehicle 100 into autonomous motion (and into a traffic flow) along the example of holding pattern 420. The control unit 200 prompts such motion upon various events, such as upon a lapse of time, a sensing of a parking location becoming available, a need to move due to obstruction of traffic, etc. Once in motion, the vehicle may park at a parking location P1 or P2 based on the parameters provided by the vehicle user, as with the navigation graphic user interface 300, or come to a stopped state, and then again into motion based upon the criteria set out herein.

While in the holding pattern 420, the parking assistance control unit 200 periodically determines whether a parking location becomes available based upon the vehicle user's input to the navigation graphic user interface 300. Such determination may be made based upon, as discussed herein, vehicle-to-vehicle communications 232, vehicle-to-infrastructure communications 234, and/or sensor data 216 provided by vehicle sensor devices 102, 104, and 106 (see FIGS. 1 and 2). When the predetermined period of time lapses for the holding pattern 420, the parking assistance control unit 200 transmits a parking status based on a result of holding pattern. That is, whether the result is parking at an available parking location within the parameters provided, or unable to park the vehicle 100 at an available parking location within the parameters provided by the vehicle user. In a further aspect, the vehicle 100 may include a request for further instructions from the vehicle user through computer 224 and/or handheld mobile device 222 (see FIG. 2).

Based on the parking status, when a parking location has not been available, the vehicle user may adjust the parking zone distance to a larger dimension. In the example of FIG. 3, the vehicle user may increase the distance of the parking parameter field 313 to one-half mile, presented as a modified user-defined parking parameter 308 for a modified parking zone 310. In the example of FIGS. 3 and 4, expanding the distance includes additional parking locations 324 covered by the increased zone area. In the alternative, a vehicle user may continue the holding patter 420 for additional predetermined period of time, or summon the vehicle 100 to pick up the vehicle user at the location 410, or another location so designated by the vehicle user, either beforehand, or through a handheld mobile device 222, for example (see FIG. 2).

Figure 5:
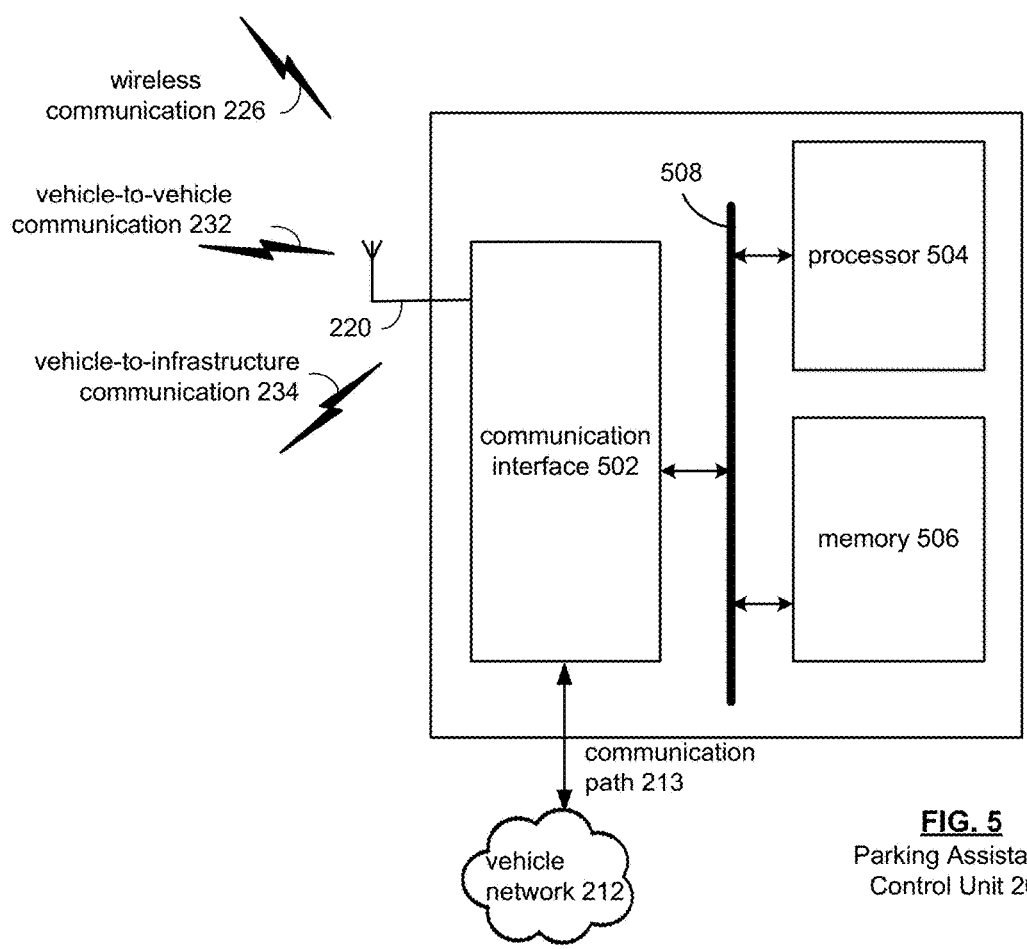
FIG. 5 is a block diagram of the parking assistance control unit of FIG. 2.

FIG. 5 is a block diagram of a parking assistance control unit 200, which includes a communication interface 502, a processor 504, and memory 506, that are communicatively coupled via a bus 508.

The processor 504 in the control unit 200 can be a conventional central processing unit or any other type of device, or multiple devices, capable of manipulating or processing information. As may be appreciated, processor 504 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element 506 may be a single memory device, a plurality of memory devices, and/or embedded circuitry of the processing module 504. Such a memory device may be a read-only memory, random access memory, volatile memory, non-volatile memory, static memory, dynamic memory, flash memory, cache memory, and/or any device that stores digital information. The memory 506 is capable of storing machine readable instructions such that the machine readable instructions can be accessed by the processor 502. The machine readable instructions can comprise logic or algorithm(s) written in programming languages, and generations thereof, (e.g., 1GL, 2GL, 3GL, 4GL, or 5GL) such as, for example, machine language that may be directly executed by the processor 504, or assembly language, object-oriented programming (OOP), scripting languages, microcode, etc., that may be compiled or assembled into machine readable instructions and stored on the memory 506. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 504 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor 504 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 504 executes, hard coded and/or operational instructions corresponding to at least some of the steps and/or functions illustrated in FIGS. 1-6 to perform autonomous-based parking assistance features and methods described herein.

The communications interface 502 generally governs and manages the vehicle user input data via the vehicle network 212 over the communication path 213 and/or wireless communication 226. The communication interface 502 also manages controller unit output data such as display data and/or parking status data to the vehicle user. There is no restriction on the present disclosure operating on any particular hardware arrangement and therefore the basic features herein may be substituted, removed, added to, or otherwise modified for improved hardware and/or firmware arrangements as they may develop.

The sensor data 216 (see FIG. 2) includes capturing of intensity or reflectivity returns of the environment surrounding the vehicle 100, and relative object distance. In general, data captured by the sensor devices 102, 104 and/or 106 and provided to the parking assistance control unit 200 via the communication path 213 can be used by one or more of applications of the vehicle 100 to determine the environment surroundings of the vehicle, and to also improve positional accuracy upon autonomous parking features and methods, handheld mobile device 222 of the vehicle user by the wireless communication 226 via the antenna 220.

The antenna 220, with the wireless communications interface, operates to provide wireless communications with the parking assistance control unit 200, including vehicle-to-infrastructure communication 234, vehicle-to-vehicle communication 232, and/or wireless communication 226.

Such communications range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), and/or variations thereof.

Figure 6:
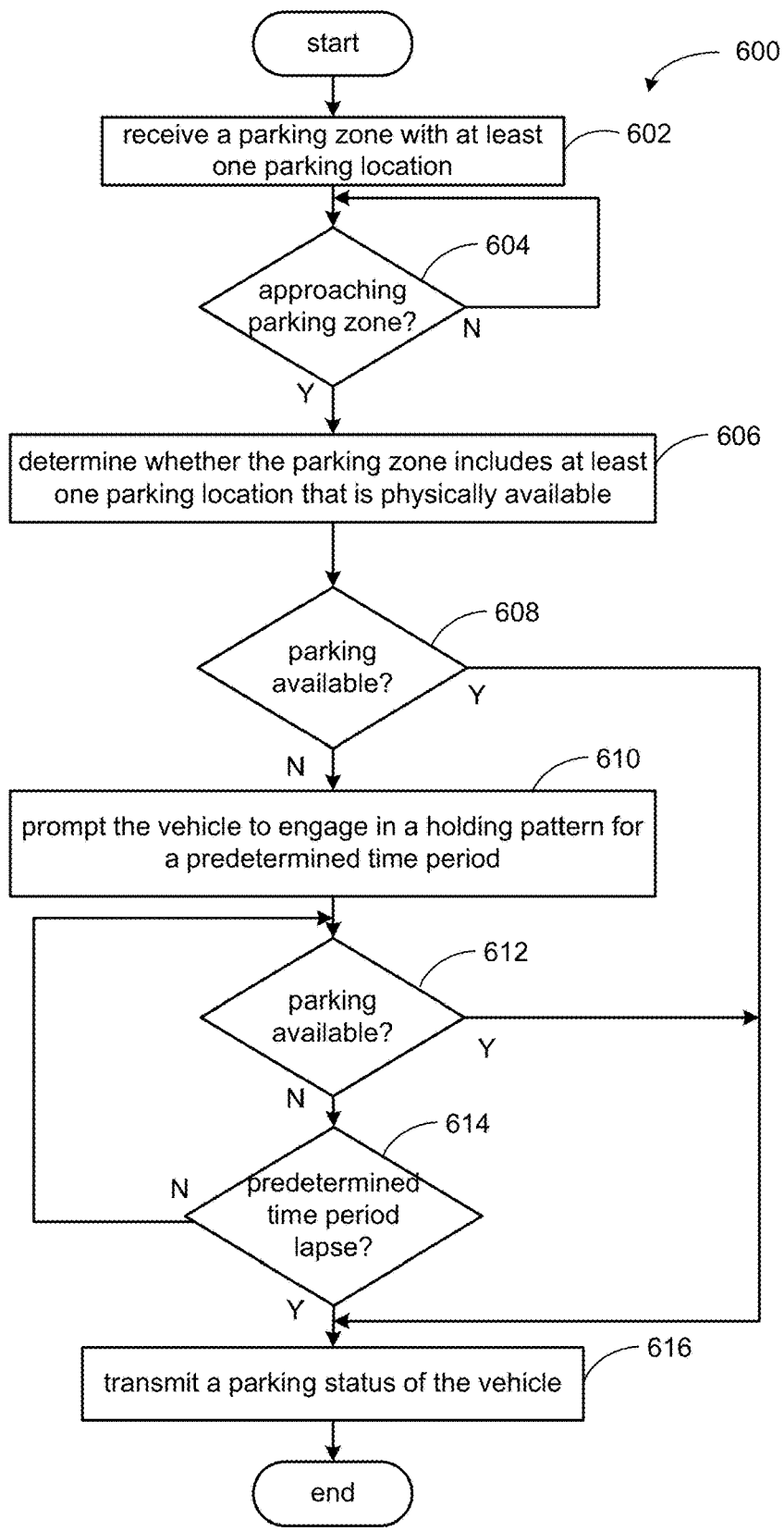
FIG. 6 is an example process in the parking assistance control unit of FIG. 2.

FIG. 6 is an example process 600 in a parking assistance control unit 200 for a vehicle 100 that is capable of autonomous operation.

In operation 602, the parking assistance control unit receives a parking zone. The parking zone is based on a destination location selected by a vehicle user, and a parking parameter, which may define the area associated with the parking zone. Such information may be received through a navigation graphic user interface. The area of the parking zone may also relate to a distance from the destination location selected by the vehicle user, and further operates to identify parking locations associated with the parking zone. When, at operation 604, on approach to a parking zone, the parking assistance control unit at operation 606 determines whether a respective parking zone includes at least one parking location that is available for parking the vehicle. When a parking location is available, the parking assistance control unit at operation 616 transmits a parking status of the vehicle 100. The vehicle user may receive the parking status of the vehicle, which may depict the location of the vehicle 100 on a mapping display.

At operation 608, when the parking zone does not include at least one parking location that is available for the vehicle 100 (see, e.g., FIG. 1), the parking assistance control unit 200, at operation 610, prompts the vehicle 100 to engage in a holding pattern for a predetermined time period.

As may be appreciated by one of skill in the art, the form of holding pattern may be selected by a vehicle user through the navigation graphic user interface, may be selected by the parking assistance control unit 200, or by other suitable operations. For example, when the holding pattern is selected and/or generated by the parking assistance control unit 200, environmental factors may be considered such as traffic flow, the amount of possible parking locations, parking location turnover, etc. For example, with a heavy traffic flow, a limited amount of possible parking locations, and low parking location turnover (for example, in an office district in which low parking location turnover occurs during the hours of 9:00 am to 5:00 pm), the parking assistance control unit 200 may generate a longer-distance holding pattern 420. In contrast, with a medium-to-heavy traffic flow, a higher amount of possible parking locations (based on parking ratios, such as the number of parking locations per thousand square feet of building space), and higher parking location turnover (such as in a retail district, in which briefer business and/or transactions occur), the parking assistance control unit may generate a shorter-distance holding pattern 420. Information regarding these factors may be obtained from vehicle-to-infrastructure communications 234, as well as vehicle-to-vehicle communications 232.

The holding pattern executed by the parking assistance control unit 200 operates to permit further flexibility to a vehicle user in the event a parking location is not available because the vehicle 100 remains being capable of being summoned by the vehicle user. Referring briefly back to FIG. 3, a vehicle user may enter the predetermined period of time for the holding patterns as a "duration". The duration may be the period that the vehicle user may expect to conduct business or an errand at the destination location, or may be an estimate by the parking assistance control unit 200 of sufficient time to increase the likelihood of coming upon an available parking location at operation 612.

Accordingly, whether the vehicle 100 is located at a parking location or in a holding pattern, the vehicle user may summon the vehicle 100. Locating an available parking location with the use of a holding pattern, however, operates to conserve fuel costs (petroleum-based fuel and/or electric cell fuel costs), and also aids in reducing traffic congestion. In contrast, a continuous holding pattern does not conserve fuel costs, and may add to traffic congestion for an area.

The availability of a parking location within a parking zone may be based on whether the parking location is not occupied. Other considerations of a parking location availability may also include whether the parking location has dimensions sufficient to receive the vehicle 100, whether due to the space allotted to the parking location, or whether other vehicles have parked such that the vehicle 100 may not fit properly in the parking location. Further considerations may include parking ordinances and/or other such restrictions that would not permit a parking location to otherwise be available.

When a holding pattern is a dynamic holding pattern, the parking assistance control unit 200 operates to place the vehicle 100 (FIG. 1) in motion with a traffic flow, where one of many possible parking locations of respective parking zones may become available. The holding pattern is resource intensive because autonomous driving results in additional miles being added to the trip. Also, when heavy traffic is present (for example, as may be indicated by vehicle-to-infrastructure devices, for example), placing the vehicle 100 into the traffic flow to find an available parking location adds to the traffic congestion. Statistical considerations may be used to indicate the likelihood that there may be an available parking location with regard to traffic conditions, and also with regard to a time factor.

When a holding pattern is a stationary holding pattern adjacent to a parking location, the parking assistance control unit 200 waits-in-place for a parking location to become available. The parking assistance control unit 200 executes a stationary holding pattern, for example, when there is a larger amount of parking location turnover. In the example of FIG. 4, the vehicle 100 is adjacent a parking location. In a dynamic holding pattern, the vehicle 100 would remain in motion.

In a combinational stationary and dynamic holding pattern, the vehicle 100 may be in a stopped state, but then autonomously proceed along a holding pattern 420. In the example of FIG. 4, the vehicle 100 is stopped along the side of the road "XYZ Avenue," but outside the parking zone 316. The parking assistance control unit 200 causes the vehicle 100 into autonomous motion (and into a traffic flow) along the example of holding pattern 420. The control unit 200 prompts such motion upon various events, such as upon a lapse of time, a sensing of a parking location becoming available, a need to move due to obstruction of traffic, etc. Once in motion, the vehicle 100 may park at a parking location based on the parameters provided by the vehicle user, as through the navigation graphic user interface 300, or come to a stopped state, and then again into motion based upon the criteria set out herein.

While in the holding pattern, the parking assistance control unit 200 periodically determines at operation 612 whether a parking location becomes available based upon the vehicle user's input to the navigation graphic user interface 300. Such determination may be made based upon, as discussed herein, on vehicle-to-vehicle communication 232, vehicle-to-infrastructure communications 234, and/or sensor data 216 provided by vehicle sensor devices 102, 104, and 106 (see FIGS. 1 and 2). When, at operation 614, the predetermined period of time lapses for the holding pattern, the parking assistance control unit 200 transmits at operation 616 a parking status based on a result of the holding pattern. That is, whether the result is parking at an available parking location within the parameters provided, or unable to park the vehicle 100 at an available parking location within the parameters provided by the vehicle user. In a further aspect, the vehicle may include a request for further instructions from the vehicle user through computer 224 and/or handheld mobile device 222 (see FIG. 2).

Based on the parking status, when a parking location has not been available, the vehicle user may adjust the parking zone distance to a larger dimension. By expanding the distance for permissible parking locations in relation to a destination location, additional parking locations are presented under the increased zone area. In the alternative, a vehicle user may instruct the parking assistance control unit to continue the holding pattern for additional predetermined period of time, or summon the vehicle 100 to pick up the vehicle user at the location 410, or another location so designated by the vehicle user, either beforehand, or through a handheld mobile device 222, for example (see FIG. 2).

While particular combinations of various functions and features of the present invention have been expressly described herein, other combinations of these features and functions are possible that are not limited by the particular examples disclosed herein are expressly incorporated within the scope of the present invention.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal.

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing a parking assistance for an autonomous vehicle.

It will be apparent to those skilled in the art that the disclosed invention may be modified in numerous ways and may assume many embodiments other than the preferred forms specifically set out and described above. Accordingly, it is intended by the appended claims to cover all modifications of the invention that fall within the true spirit and scope of the invention.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method in a parking assistance control unit for a vehicle capable of autonomous operation, the method comprising:
    receiving a parking zone based on a destination location and a user-defined parking parameter, the parking zone including a plurality of parking locations;
    when on approach to the parking zone under the autonomous operation, determining whether the parking zone includes at least one parking location of the plurality of parking locations that is physically available for parking the vehicle;
    when the parking zone does not include the at least one parking location that is physically available for parking the vehicle:
        prompting the vehicle to engage in a holding pattern for a predetermined period of time, wherein the holding pattern includes at least one of a dynamic holding pattern indicative of placing the vehicle in motion and a stationary holding pattern indicative of placing the vehicle in a stopped state;
        while in the holding pattern under the autonomous operation, periodically determining whether the at least one parking location becomes available;
        when the predetermined period of time lapses, transmitting a parking status of the vehicle based on a result of the periodically determining whether the at least one parking location becomes available.

2. The method of claim 1, wherein the determining whether the parking zone includes at least one parking location that is physically available for parking the vehicle further comprises at least one of:
    receiving a vehicle-to-vehicle communications relating to the at least one parking location;
    receiving a vehicle-to-infrastructure communications relating to the at least one parking location; and
    sensing through a plurality of sensor devices at a periphery of the vehicle relating to the at least one parking location.

3. The method of claim 1, wherein the holding pattern comprises:
    a combinational stationary and dynamic holding pattern.

4. The method of claim 1, wherein the holding pattern is based on traffic trends related to the parking zone.

5. The method of claim 4, wherein the traffic trends include at least one of:
    a traffic density assessment; and
    a local venue activity assessment.

6. The method of claim 1, wherein the holding pattern is based on a vehicle restriction, the vehicle restriction including at least one of:
    a vehicle range limitation; and
    a maneuverability limitation of the vehicle.

7. The method of claim 1, further comprising:
determining whether the predetermined period of time has elapsed; and
when the period of time has elapsed:
receiving a secondary parking zone based on the destination location and the user-defined parking parameter;
when on approach to the secondary parking zone under the autonomous operation, determining whether the secondary parking zone includes at least one parking location that is physically available for parking the vehicle; and
when the secondary parking zone does not include the at least one parking location:
prompting the vehicle to engage in another holding pattern for another period of time;
while in the holding pattern under the autonomous operation, periodically determining whether the secondary parking zone includes the at least one parking location or another at least one parking location; and
transmitting another parking status of the vehicle.

8. The method of claim 1, wherein the parking zone is defined by a graphic user interface of the vehicle.

9. A parking assistance control unit for a vehicle comprising:
a wireless communication interface to service communication with user equipment of a vehicle user;
a plurality of sensor devices disposable about the vehicle;
one or more processors coupled to the wireless communication interface and in communication with the plurality of sensor devices, the one or more processors for controlling operations of the parking assistance control unit;
a memory coupled to the one or more processors, the memory for storing data and program instructions used by the one or more processors, wherein the one or more processors are configured to execute instructions stored in the memory to:
receive a parking zone based on a destination location and a user-defined parking parameter, the parking zone including a plurality of parking locations;
when on approach to the parking zone under the autonomous operation, determine whether the parking zone includes at least one parking location being physically available for parking the vehicle via sensor data of the plurality of sensor devices; and
when the parking zone does not include the at least one parking location that is physically available for parking the vehicle:
prompt the vehicle to engage in a holding pattern for a predetermined period of time, wherein the holding pattern includes at least one of a dynamic holding pattern indicative of placing the vehicle in motion and a stationary holding pattern indicative of placing the vehicle in a stopped state;
while in the holding pattern under the autonomous operation, periodically determining whether the at least one parking location becomes available; and
when the predetermined period of time lapses, transmit via the wireless communication interface to the user equipment of the vehicle user a parking status of the vehicle based on a result of the periodically determining whether the at least one parking location becomes available.

10. The parking assistance control unit of claim 9, wherein the one or more processors are further configured to execute further instructions stored in the memory to determine whether the parking zone includes at least one parking location that is physically available for parking the vehicle further comprising:
vehicle-to-vehicle communication relating to the at least one parking location; and
vehicle-to-infrastructure communication relating to the at least one parking location.

11. The parking assistance control unit of claim 10, wherein the holding pattern comprises:
a combinational stationary and dynamic holding pattern.

12. The parking assistance control unit of claim 10, wherein the holding pattern is based on traffic trends related to the parking zone.

13. The parking assistance control unit of claim 12, wherein the traffic trends include at least one of:
a traffic density assessment; and
a local venue activity assessment.

14. The parking assistance control unit of claim 10, wherein the holding pattern is based on a vehicle restriction, the vehicle restriction including at least one of:
a vehicle range limitation; and
a maneuverability limitation of the vehicle.

15. The parking assistance control unit of claim 10, wherein the one or more processors are further configured to execute further instructions stored in the memory to:
determine whether the predetermined period of time has elapsed; and
when the predetermined period of time has elapsed:
receive a secondary parking zone based on the destination location and the user-defined parking parameter;
when on approach to the secondary parking zone under the autonomous operation, determine whether the secondary parking zone includes at least one parking location that is physically available for parking the vehicle; and
when the secondary parking zone does not include the at least one parking location:
prompt the vehicle to engage in another holding pattern for another period of time;
while in the holding pattern under the autonomous operation, periodically determine whether the secondary parking zone includes the at least one parking location or another at least one parking location; and
transmit another parking status of the vehicle.

16. The parking assistance control unit of claim 9, wherein the parking zone is defined by a graphic user interface of the vehicle.

17. A parking assistance device comprising:
one or more sensor devices disposable about a vehicle, the one or more sensor devices configured to monitor surroundings relative to the vehicle;
a wireless communication interface operable to service communications; and
a computing device coupled to the wireless communication interface and in communication with the one or more sensor devices, the computing device including:
one or more processors, the one or more processors for controlling operations of the parking assistance device;
a memory coupled to the one or more processors, the memory for storing data and program instructions used by the one or more processors, wherein the one or more processors are configured to execute instructions stored in the memory to:

receive a parking zone based on a destination location and a user-defined parking parameter, the parking zone including a plurality of parking locations;

when on approach to the parking zone under the autonomous operation, determine whether the parking zone includes at least one parking location that is physically available for parking the vehicle via sensor data of the one or more sensor devices; and when the parking zone does not include the at least one parking location that is physically available for parking the vehicle:

prompt the vehicle to engage in a holding pattern for a predetermined period of time, wherein the holding pattern includes at least one of a dynamic holding pattern indicative of placing the vehicle in motion and a stationary holding pattern indicative of placing the vehicle in a stopped state;

while in the holding pattern under the autonomous operation, periodically determining whether the at least one parking location becomes available; and when the predetermined period of time lapses, transmit via the wireless communication interface, a parking status of the vehicle based on a result of the periodically determining whether the at least one parking location becomes available.

18. The parking assistance device of claim 17, wherein the holding pattern comprises:

a combinational stationary and dynamic holding pattern.

19. The parking assistance device of claim 17, wherein the holding pattern is based on traffic trends related to the parking zone.

20. The parking assistance device of claim 19, wherein the traffic trends include at least one of:

a traffic density assessment; and a local venue activity assessment.

\* \* \* \* \*